United States Patent [19]

Aoshima et al.

[11] Patent Number: 5,077,745
[45] Date of Patent: Dec. 31, 1991

[54] MODE-LOCKED SOLID-STATE RING LASER

[75] Inventors: Shinichiro Aoshima; Kenshi Fukumitsu, both of Shizuoka, Japan

[73] Assignee: Hamamatsu Photonics K. K., Japan

[21] Appl. No.: 505,468

[22] Filed: Apr. 6, 1990

[30] Foreign Application Priority Data

Apr. 7, 1989 [JP] Japan .................................. 1-89477

[51] Int. Cl.⁵ ............................................. H01S 3/098
[52] U.S. Cl. ........................................ 372/18; 372/22; 372/94
[58] Field of Search ................... 372/13, 18, 21, 22, 372/26, 30, 94, 6, 66; 350/358

[56] References Cited

U.S. PATENT DOCUMENTS

| | | | |
|---|---|---|---|
| 3,412,251 | 11/1968 | Hargrove | 372/18 |
| 3,530,400 | 9/1970 | Pratt, Jr. et al. | 372/28 |
| 3,566,303 | 2/1971 | De Maria | 372/24 |
| 3,675,150 | 7/1972 | Harris et al. | 372/26 |
| 3,696,310 | 10/1972 | Paoli et al. | 372/18 |
| 3,884,549 | 5/1975 | Wang et al. | 350/96.12 |
| 4,057,770 | 11/1977 | Henningsen et al. | 372/13 |
| 4,339,821 | 7/1982 | Coppock et al. | 372/18 |
| 4,485,473 | 11/1984 | Tang et al. | 372/18 |
| 4,739,507 | 4/1988 | Byer et al. | 372/22 |
| 4,783,170 | 11/1988 | Bergstrom | 356/350 |
| 4,835,778 | 5/1989 | Kafka et al. | 372/6 |
| 4,864,577 | 9/1989 | Aoshima et al. | 372/18 |
| 4,924,476 | 5/1990 | Behfar-Rad et al. | 372/94 |

FOREIGN PATENT DOCUMENTS

| | | |
|---|---|---|
| 61-208280 | 9/1986 | Japan . |
| 1068515 | 5/1967 | United Kingdom . |
| 1166248 | 10/1969 | United Kingdom . |
| 1187535 | 4/1970 | United Kingdom . |

OTHER PUBLICATIONS

Patents Act 1977, "Examiner's Report to the Comptroller Under Section 17 (The Search Report)".

Primary Examiner—William L. Sikes
Assistant Examiner—Galen J. Hansen
Attorney, Agent, or Firm—Finnegan, Henderson, Farabow, Garrett, and Dunner

[57] ABSTRACT

Part of a solid-state lasing medium is made to be a mode locking section. An ultrasonic transducer being supplied with a high-frequency voltage generates an ultrasonic wave to propagate through the mode locking section. As a result, laser light pulses having a repetition frequency determined by the frequency of the ultrasonic wave are output from a laser apparatus.

6 Claims, 3 Drawing Sheets

MODE-LOCKED SOLID-STATE RING LASER

BACKGROUND OF THE INVENTION

This invention relates to a mode-locked solid-state laser in which its axial mode of oscillation is locked by means of an ultrasonic wave.

A laser apparatus is known which, as typically shown in Japanese Patent Application Unexamined Publication No. 61-208280, extracts part of light components at multiple wavelengths and that modulates the extracted component with an ultrasonic wave to achieve mode locking.

Most of the conventional ultrasonic-wave-modulated laser apparatus use a gas laser such as an argon laser tube. Further, the ultrasonic optical modulator is located between the output mirror and the laser oscillating tube, so that not only is the laser apparatus bulky and complex in composition but also it is difficult to achieve stable operation and complicated adjustments are needed.

SUMMARY OF THE INVENTION

The present invention has been accomplished under the circumstances described above and its principal object is to provide a mode-locked solid-state laser that can be designed as a compact system, is simple in construction, can be adjusted easily, and can achieve stable operation.

This object of the present invention can be attained by a mode-locked solid-state laser in which part of a solid-state lasing medium is made to be a mode locking section through which an ultrasonic wave propagates. Through intensity modulation of laser light with the ultrasonic wave, laser light pulses are produced whose repetition frequency is determined by the frequency of the ultrasonic wave.

In an embodiment of the invention, the solid-state laser constitutes a ring resonator.

In another embodiment, an SHG (Second Harmonic Generation) device is disposed at a position apart from the mode locking section by one half of a resonator length.

In the solid-state laser of the present invention, mode locking is achieved by allowing an ultrasonic wave to propagate directly through a solid-state lasing medium, so that the laser apparatus can be designed as a compact system, is simple in construction, can be easily adjusted, and can achieve stable operation. Further, the laser of the present invention allows a greater optical output to be produced from an SHG device.

DETAILED DESCRIPTION OF THE INVENTION

Several embodiments of the present invention are described below with reference to the accompanying drawings.

Figure 1:
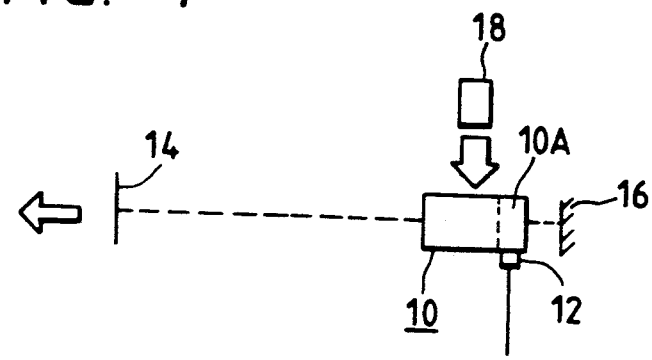
FIG. 1 is a schematic cross-sectional view of a mode-locked solid-state laser according to a first embodiment of the present invention.

FIG. 1 shows a first embodiment, in which a mode locking section 10A that is an integral part of a solid-state lasing medium 10 is provided with an ultrasonic transducer 12 that allows ultrasonic waves to propagate through the lasing medium. A high-frequency voltage is applied to the transducer 12 to lock the mode of laser light emitted from the lasing medium 10. Shown by 14 in FIG. 1 is an output mirror and 16 is a reflecting mirror in a resonator. Shown by 18 is a laser diode for injecting excitation energy into the lasing medium 10.

In the first embodiment, an ultrasonic wave is allowed to propagate directly through the solid-state lasing medium 10 by means of the transducer 12, so that the intensity of a standing ultrasonic wave in the lasing medium 10 changes at a frequency twice the high frequency applied to the transducer 12, allowing for modulation with the same frequency to be performed on the intensity of light emitted from the lasing medium 10.

If this light modulation frequency is written as f, mode locking can be achieved by selecting the length of the resonator or the resonator optical path length, L, in such a way that the time required for the emitted light to move back and forth over the path in the laser resonator will be 1/f.

Hence, the output mirror 14 will produce pulses of light having a repetitive frequency of f and with a very small time width and a very large peak power. Stated more specifically, pulses of light that are repetitive at f/n (n<1) or f (n≧1) are produced if the following condition is satisfied:

$$L = nc/2f \quad (1)$$

where c is the velocity of light, and n is an integer or its reciprocal.

In the first embodiment described above, the solid-state lasing medium 10 is excited by the laser diode 18, but other means may of course be used to inject excitation energy into the lasing medium 10.

Figure 2:
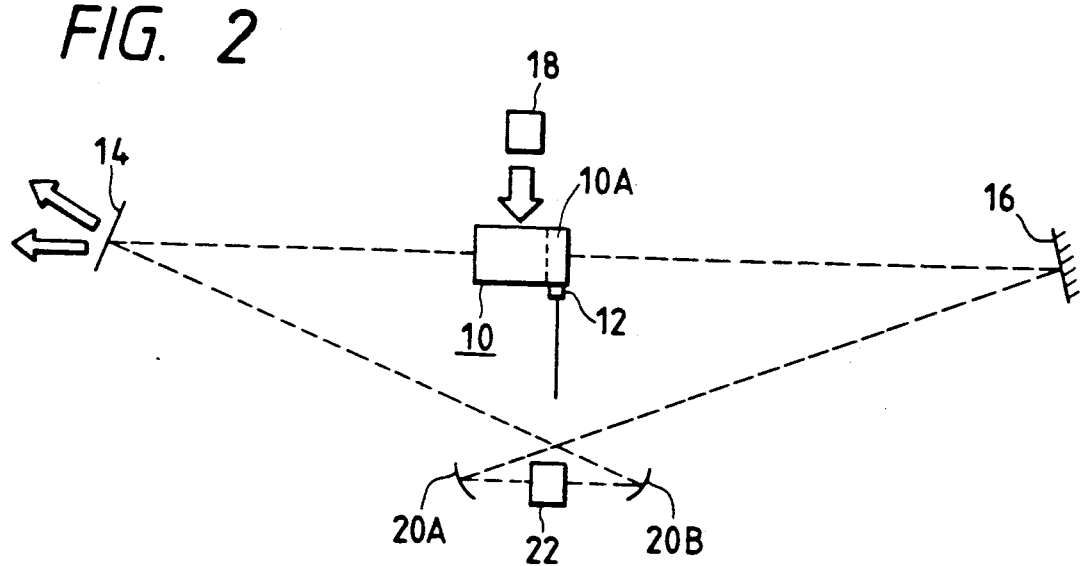
FIGS. 2-8 are schematic cross-sectional views of mode-locked solid-state lasers according to second to eighth embodiments of the present invention.

A second embodiment of the present invention is described with reference to FIG. 2.

The second embodiment is essentially the same as the first embodiment except that a pair of resonating concave mirrors 20A and 20B are provided in such a way that they form a ring resonator together with the output mirror 14 and the reflecting mirror 16. As shown in FIG. 2, the output mirror 14 and the reflecting mirror 16 are disposed symmetrically with the axis of symmetry being the mode locking section 10A through which an ultrasonic wave is allowed to propagate by means of the transducer 12. The pair of resonating concave mirrors 20A and 20B are also disposed symmetrically with the axis of symmetry passing through the mode locking section 10A. In the example shown in FIG. 2, an SHG (Second Harmonic Generation) device 22 typically made of a KTP, KDP or ADP crystal is positioned intermediate between the pair of resonating concave mirrors 20A and 20B.

In the second embodiment, the SHG device is placed in the laser resonator associated with high light intensity. Further, a laser beam is converged by the concave mirrors 20A and 20B to produce a high density of light in the SHG device, thereby producing a higher efficiency of conversion by SHG. In addition, the solid-state lasing medium 10 is mode-locked, so that the laser light emitted therefrom has a narrow pulse width while producing a high peak-power. This contributes to a further enhancement in the efficiency of conversion by the SHG device 22.

In the SHG device 22, light pulses propagating in opposite directions meet with each other to achieve an increase in momentary light intensity, and this is also effective in increasing the efficiency of conversion by SHG.

Figure 3:
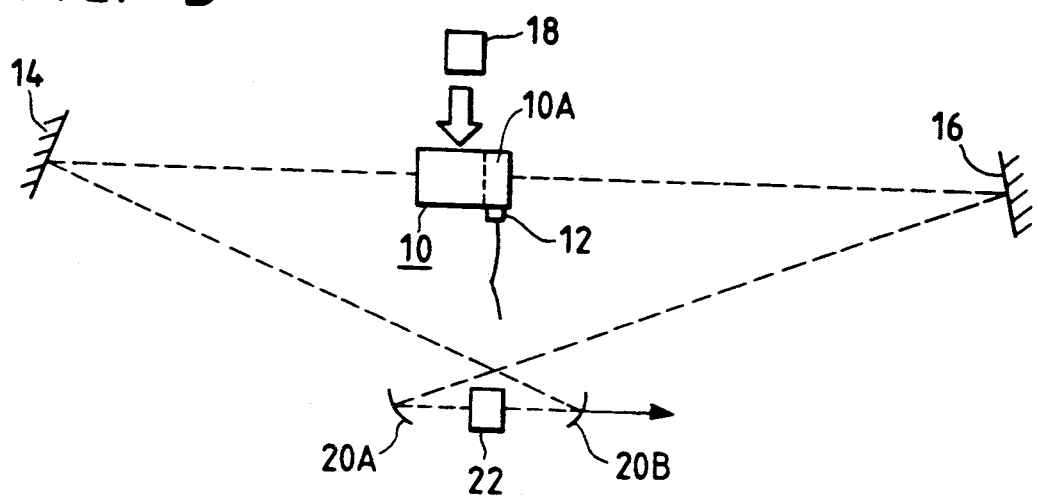

In the second embodiment, the output mirror 14 is coated on its surface in such a way that the fundamental light is totally reflected whereas part of the SHG light is transmitted. Each of the reflecting mirror 16 and the concave mirrors 20A and 20B in the resonator is provided with a coating that totally reflects both the fundamental light and the SHG light, so that pulses of SHG laser light can be picked up from the output mirror 14. If desired, SHG laser pulses may be picked up from either the concave mirror 20A or 20B or both as in the third embodiment shown in FIG. 3. In this case, the coatings are made to differ than in the second embodiment so that either the concave mirror 20A or 20B or both are used as output mirrors whereas the output mirror 14 is designed as a full reflecting mirror. The coatings may be further modified in such a way that part of the fundamental wave is produced from the output mirror 14 whereas the SHG light is picked up from either the concave mirror 20A or 20B or both.

The foregoing description concerns the case where the output mirror 14, the reflecting mirror 16, and the concave mirrors 20A and 20B are positioned symmetrically with respect to the mode locking section 10A. It should however be noted that similar effects can be attained irrespective of the geometry of the resonator as long as the optical distance from the mode-locking section 10A through the reflecting mirror 16 and the concave mirror 20A to the SHG device 22 is equal to the optical distance from the mode-locking section 10A through the output mirror 14 and the concave mirror 20B to the SHG device 22. This is also true with the other embodiments of the present invention to be described below.

With a ring laser, the time required for light to propagate round the resonator is expressed by $L_R/c$ where $L_R$ is the length of the resonator. Hence, in this case, the condition for mode locking is established by replacing L in equation (1) with $(\frac{1}{2})L_R$.

Figure 4:
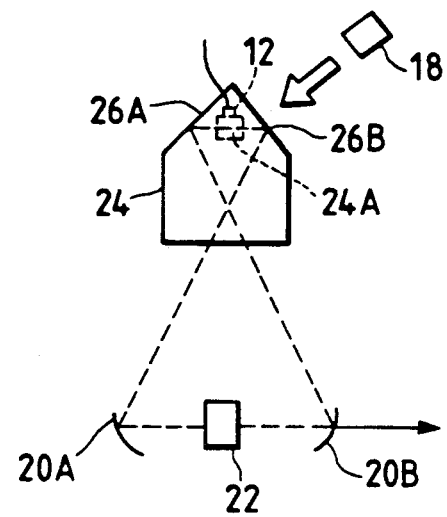

A fourth embodiment of the present invention is now described with reference to FIG. 4. In the fourth embodiment, the two top faces of a solid-state lasing medium 24 in the shape of a pentaprism are coated to form a pair of reflecting mirrors 26A and 26B, with a mode locking section 24A being formed on the upper optical axis. Further, a pair of resonating concave mirrors 20A and 20B and a central SHG device 22 are positioned as in the second and third embodiments to construct a ring laser.

In the fourth embodiment, excitation light is launched into the solid-state lasing medium 24 from either the reflecting mirror 26A or 26B or both. The SHG output light is picked up from either the resonating concave mirror 20A or 20B or both.

Figure 5:
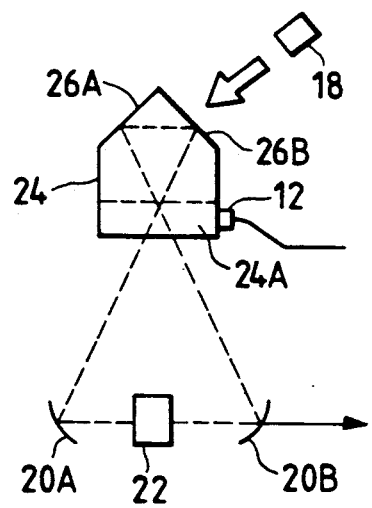

A fifth embodiment of the present invention is described below with reference to FIG. 5. In the fifth embodiment, the two top faces of a solid-state lasing medium 24 in a pentagonal shape are coated to form a pair of reflecting mirrors 26a and 26B, with a mode-locking section 24A being formed at the bottom part. Further, a pair of resonating concave mirrors 20A and 20B and a central SHG device 22 are positioned as in the second and third embodiments to construct a ring laser.

In the fifth embodiment, excitation light is launched into the solid-state lasing medium 24 from either the reflecting mirror 26A or 26B or both. The SHG output light is picked up from either the resonating concave mirror 20A or 20B or both.

For stable lasing operation, the optical distance from the crossing of light in the mode locking section 24A through the reflecting mirrors 26A and 26B to the crossing of light in the mode locking section 24A is desirably made equal to the optical distance from the crossing of light in the mode locking section 24A through the concave mirror 20A, the SHG device 22 and the concave mirror 20B to the crossing of light in the mode locking section 24A. Under this condition, the condition for mode locking is established by replacing L in equation (1) with $(\frac{1}{2})L_R'$, where $L_R'$ is the length of the resonator defined by 20A - 22 - 20B - 26A - 26B - 20A.

Figure 6:
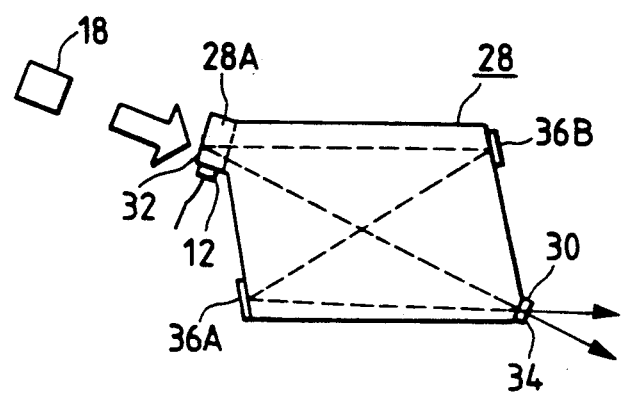

A sixth embodiment of the present invention is now described with reference to FIG. 6. In this embodiment, a mode locking section 28A and an SHG crystal device 30 are formed as integral parts of a solid-state lasing medium 28 in prism shape. Further, the outer end face of the mode locking section 28A is so coated as to form a resonating reflector mirror 32, whereas the outer end face of the SHG device 30 is so coated as to form an output mirror 34.

A pair of reflecting mirrors 36A and 36B for constructing a ring resonator are also formed by properly coating the solid-state lasing medium 28.

Figure 7:
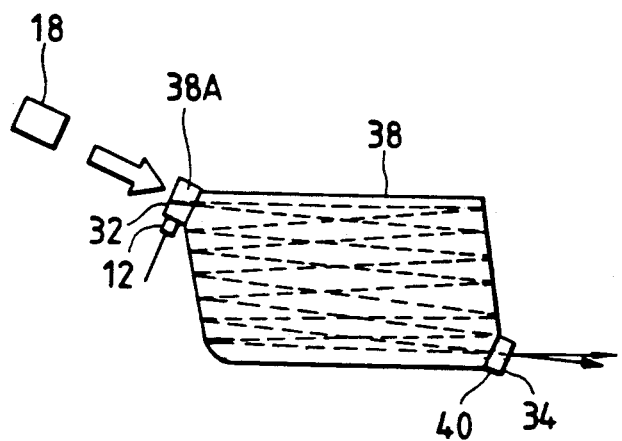

A seventh embodiment of the present invention is described below with reference to FIG. 7. In the seventh embodiment, a mode locking section 38A is provided at the apex of an acute-angled corner of a generally parallelogrammic solid-state lasing medium 38, whereas an SHG device 40 is provided at the opposite acute-angled corner of the lasing medium 38. The pair of parallel shorter sides of the lasing medium 38 are provided with a full reflecting coat. A resonating reflector mirror 32 is formed on the outer end face of the mode locking section 38A whereas an output mirror 34 is formed on the outer end face of the SHG device 40.

The seventh embodiment described above has the advantage that a sufficiently long resonator can be formed within the small solid-state lasing medium 38.

An eighth embodiment of the present invention is described with reference to FIG. 8. As in the seventh embodiment, a generally parallelogrammic solid-state lasing medium 42 is used in this eighth embodiment but the difference is that chamfered portions 44A and 44B are formed at the opposite blunt-angled corners of the parallelogram in order to cause internal total reflection within the lasing medium 42. Like the seventh embodiment, the eighth embodiment has the advantage that a sufficiently long resonator can be formed within a small lasing medium. In addition, the use of internal total reflection eliminates the need for providing a reflective coating on the chamfered portions 44A and 44B which serve as reflecting surfaces.

Figure 8:
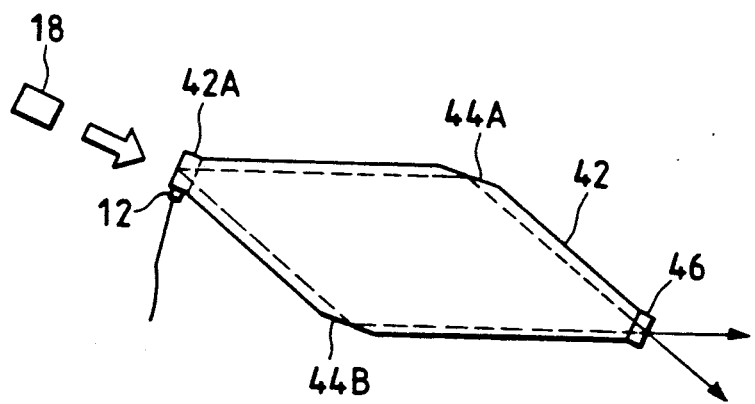

Shown by 42A and 46 in FIG. 8 are a mode locking section and an SHG device, respectively.

In each of the embodiments described above, an anti-reflection film typically made of $SiO_2$ is desirably formed at the boundary between different media with a view of minimizing possible energy loss in the resonator.

The mode-locked solid-state laser of the present invention has the advantage that it is small in size, is simple in construction, can be easily adjusted, and can achieve stable operation. Further, it allows a greater optical output to be produced from an SHG device.

What is claimed is:

1. A mode-locked solid-state laser, comprising:
   a ring resonator;
   a solid-state lasing medium having a mode locking element integral therein for generating a laser beam;
   a second harmonic generation device spaced from said mode locking element of the lasing medium by one half of one complete round path length of the ring resonator;
   means for exciting said lasing medium to generate the laser beam;
   reflecting mirror means, coupled to the lasing medium, for receiving the laser beam and reflecting it into the lasing medium;
   output mirror means, coupled to the lasing medium, for outputting at least a portion of a generated laser beam to an external device coupled to the solid-state laser; and
   transducer means, coupled to the lasing medium, for providing an ultrasonic wave having a frequency to the lasing medium such that the ultrasonic wave propagates through the mode locking element of the lasing medium to generate a pulsed laser beam having a pulse frequency associated with the frequency of the ultrasonic wave.

2. The mode-locked solid-state laser according to claim 1, wherein the output and reflecting mirror means are adjacent the lasing medium.

3. The mode-locked solid-state laser according to claim 1, wherein the output mirror means is adjacent the second harmonic generation device and the reflecting mirror means is adjacent the lasing medium.

4. The mode-locked solid-state laser according to claim 1, wherein the reflecting mirror means includes a pair of concave mirrors symmetrical with respect to the second harmonic generation device so that the second harmonic generation device is at the center of the pair of concave mirrors.

5. The mode-locked solid-state laser according to claim 2, wherein the output mirror means is adjacent the second harmonic generation device and the reflecting mirror means is adjacent the lasing medium.

6. The mode-locked solid-state laser according to claim 2, wherein the reflecting mirror means includes a pair of concave mirrors symmetrical with respect to the second harmonic generation device so that the second harmonic generation device is at the center of the pair of concave mirrors.

* * * * *